United States Patent
Haddock

[15] 3,704,840
[45] Dec. 5, 1972

[54] BULK FISHING LINE APPLICATOR
[72] Inventor: John S. Haddock, 2646 East 34th, Tulsa, Okla. 74105
[22] Filed: June 4, 1971
[21] Appl. No.: 149,929

[52] U.S. Cl...............................242/84.2 R, 242/106
[51] Int. Cl...............................A01k 89/00
[58] Field of Search.....242/106, 84.2, 84.21, 85, 105

[56] References Cited

UNITED STATES PATENTS 3,312,418    4/1967    Haddock.............................242/85
3,604,653    9/1971    Sargent............................242/84.2 R Primary Examiner—George F. Mautz
Assistant Examiner—Gregory A. Walters
Attorney—Head & Johnson

[57] ABSTRACT

In a bulk spool fishing line applicator for transferring monofilament fishing line from a bulk spool onto the spool of a spinning reel, the fishing reel line spool is rotated relative to the pickup cylinder thereof by electrical means. An automatic stop mechanism de-energizes the rotating means when a predetermined amount of line has been received on the fishing spool.

5 Claims, 6 Drawing Figures

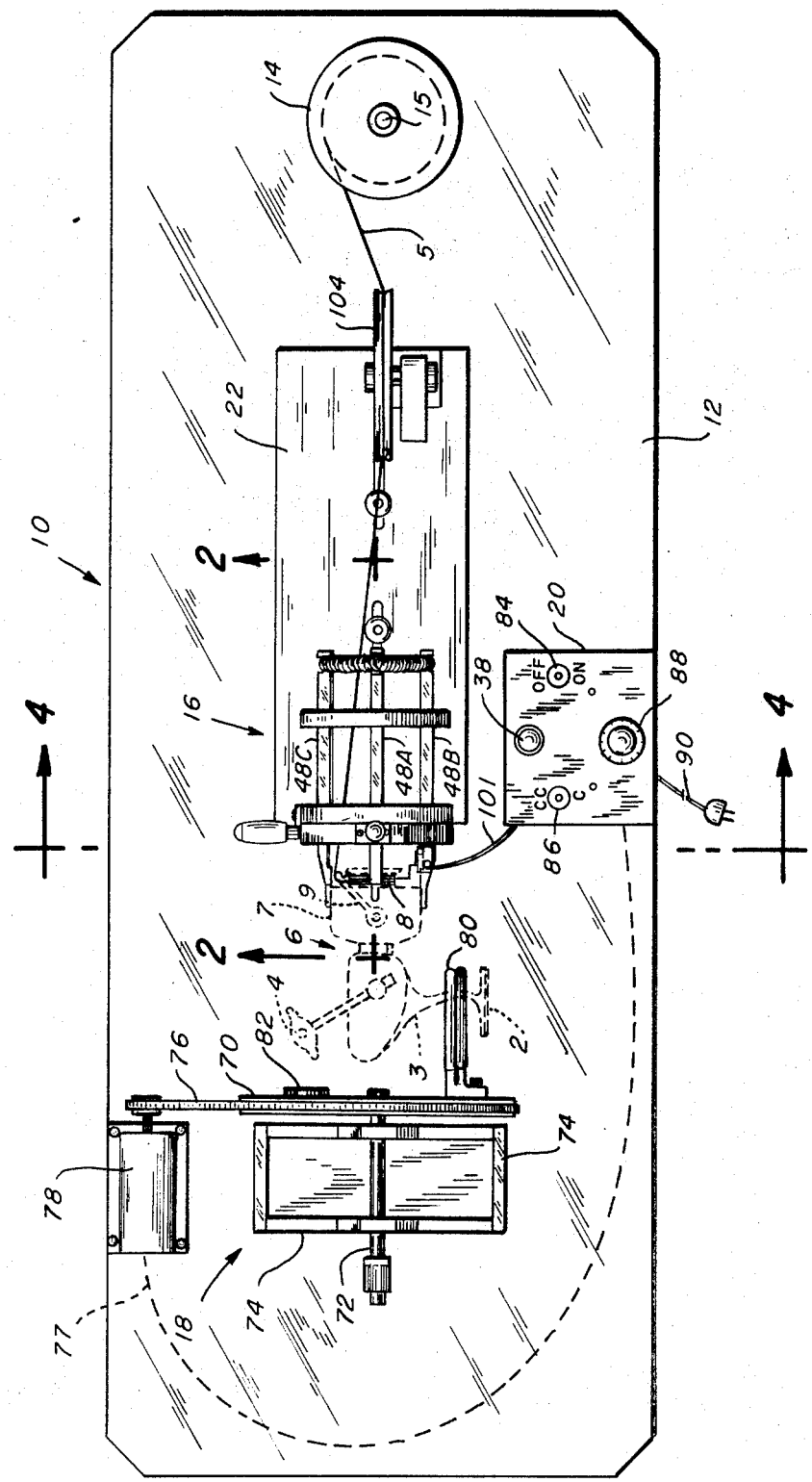

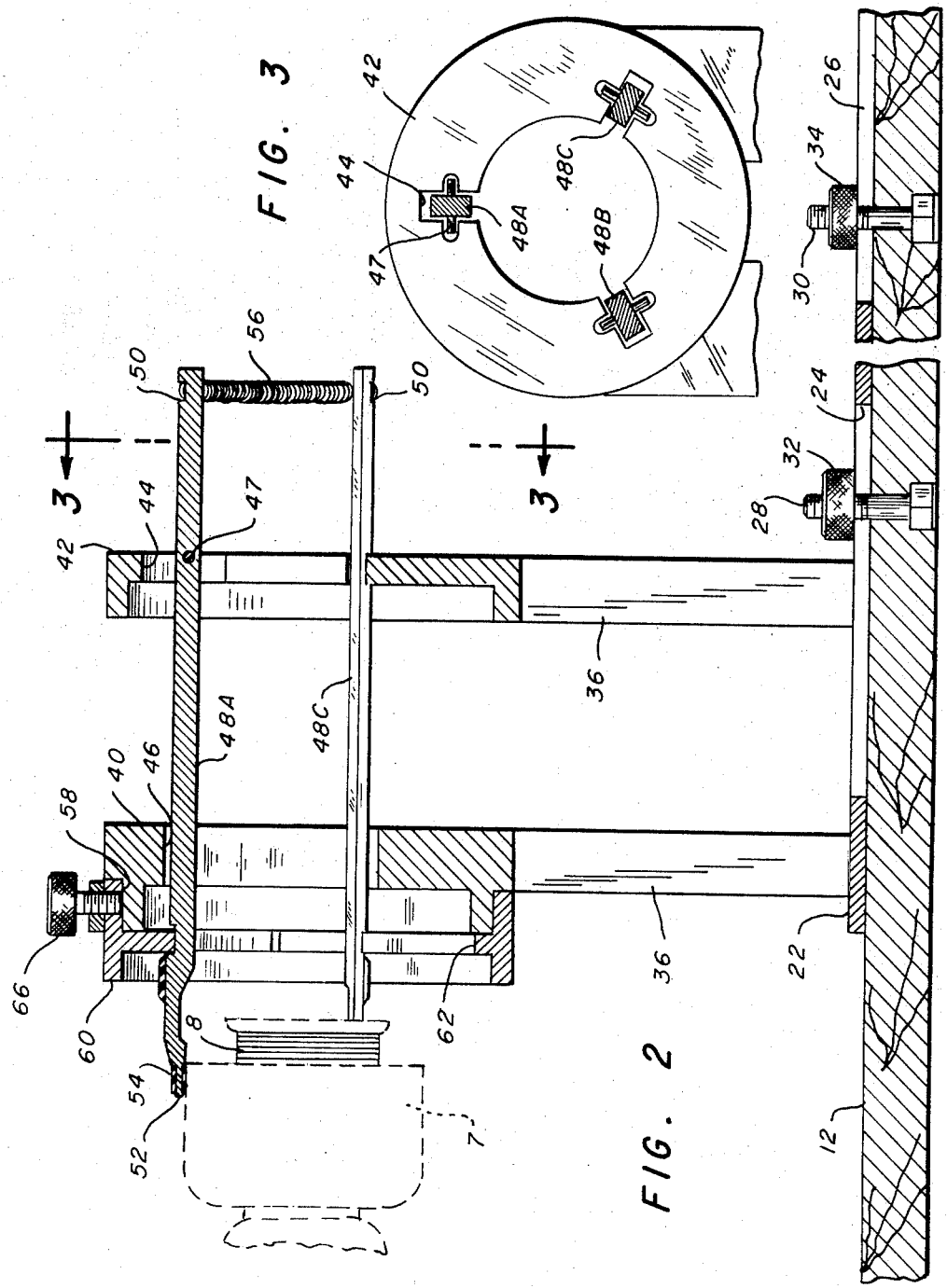

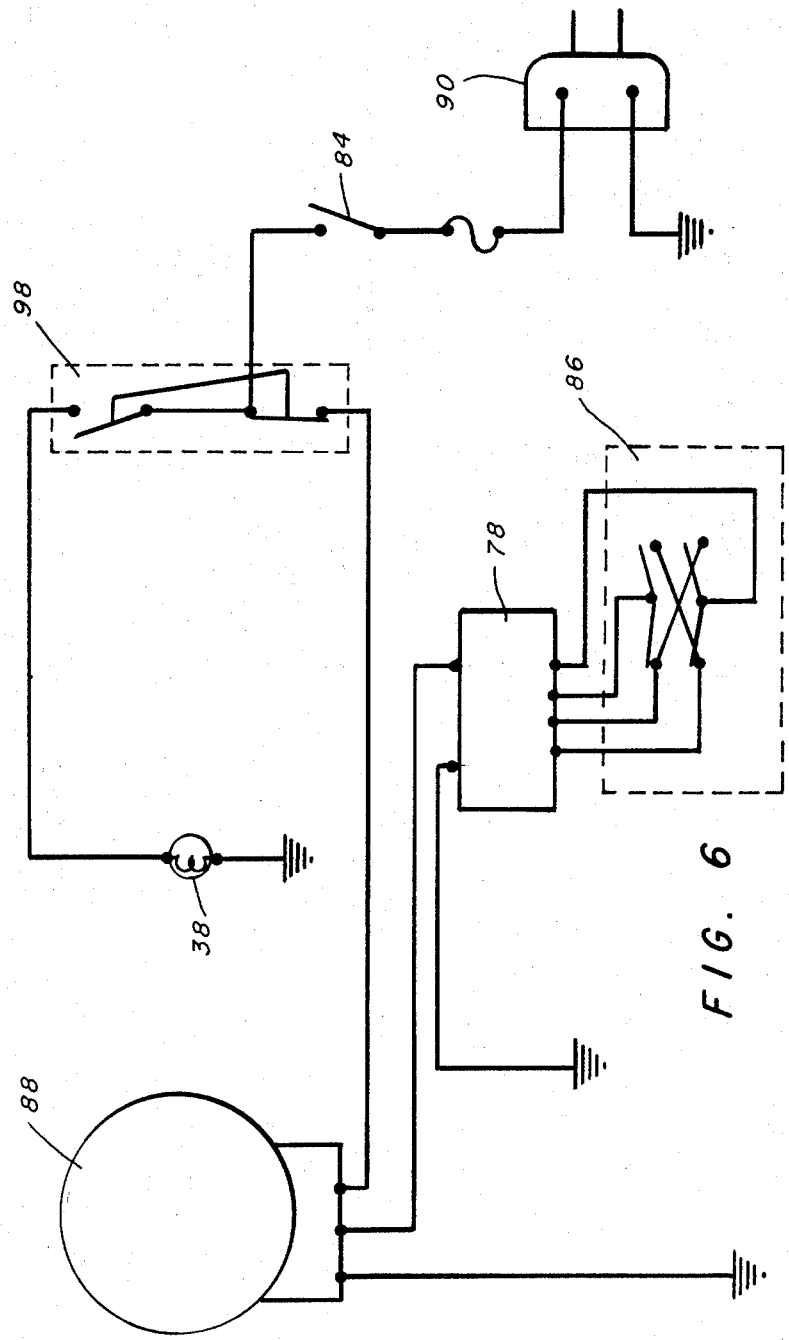

3,704,840

BULK FISHING LINE APPLICATOR

BACKGROUND OF THE INVENTION

This invention relates to an apparatus for applying line onto fishing reels. More particularly it pertains to an apparatus for applying line onto fishing reels wherein the fishing reel spool is rotated relative to the pickup cylinder of the fishing reel.

Monofilament line typically used with spinning reels presents many problems in the loading thereof onto the reel. It is important that the line be placed onto the reel spool without twisting, otherwise when case the line can become tangled very easily resulting in what is known as a bird nest which is difficult if not impossible to remove. As a result many fishing line manufacturers recommend that the spiral of the new line spool be transferred directly to the reel spool without any additional twisting or turning.

In many retail outlets spinning reel spools are loaded from the bulk spool by placing the reel spool upon an arbor connected to a motor or hand crank wherein the axis of the reel spool is parallel to the axis of the bulk line spool. Such application invariably places line on the spool unevenly during transfer as it must be guided by the hand which is time-consuming and inconvenient. Also the reel spool has to be removed from the reel.

Accordingly it is an object of this invention to provide an apparatus for applying fishing line from a bulk spool onto the spool of spinning reels which overcomes the problems heretofore encountered in transfer of such line from a bulk spool to a reel.

It is another object of this invention to provide an apparatus wherein the fishing line can be convoluted onto the stationary spool of the fishing reel from a bulk spool without removing the fishing reel spool from the fishing reel.

It is a further object of this invention to present an apparatus for transferring line from a bulk spool onto the line spool of a fishing reel wherein the fishing line spool is rotated relative to the pickup cylinder thereof; thereby utilizing the reel's mechanism to evenly distribute the line onto the spool.

It is a further object of this invention to present an apparatus for transferring monofilament line from a bulk spool onto the stationary spool of a fishing reel wherein one apparatus can be adjusted so as to enable same to be used on reels having different size pickup cylinders.

It is still a further object of this invention to present an apparatus for transferring bulk spool line onto the line spool of the fishing reel having therein means for automatically stopping the convoluting of the line onto the reel when a predetermined yardage of line has been wound onto the spool.

SUMMARY OF THE INVENTION

Generally the invention comprises a chuck for grasping the pickup cylinder of a fishing reel. Line is fed from a bulk spool onto the spool of the fishing reel by rotating the fishing reel spool relative to the pickup cylinder. The chuck for holding the fishing reel has legs which project outwardly to form a circular outline the diameter of which is adjustable to enable one apparatus to be used on different size diameter pickup cylinders.

DESCRIPTION OF THE DRAWINGS

FIG. 1 is an overall top view of the line winder apparatus of this invention.

FIG. 2 is a cross-sectional view taken along line 2—2 of FIG. 1.

FIG. 3 is a view taken along line 3—3 of FIG. 2.

FIG. 6 is an electrical schematic of the circuitry of the apparatus of this invention.

DETAILED DESCRIPTION OF THE PREFERRED EMBODIMENT

Figure 4:
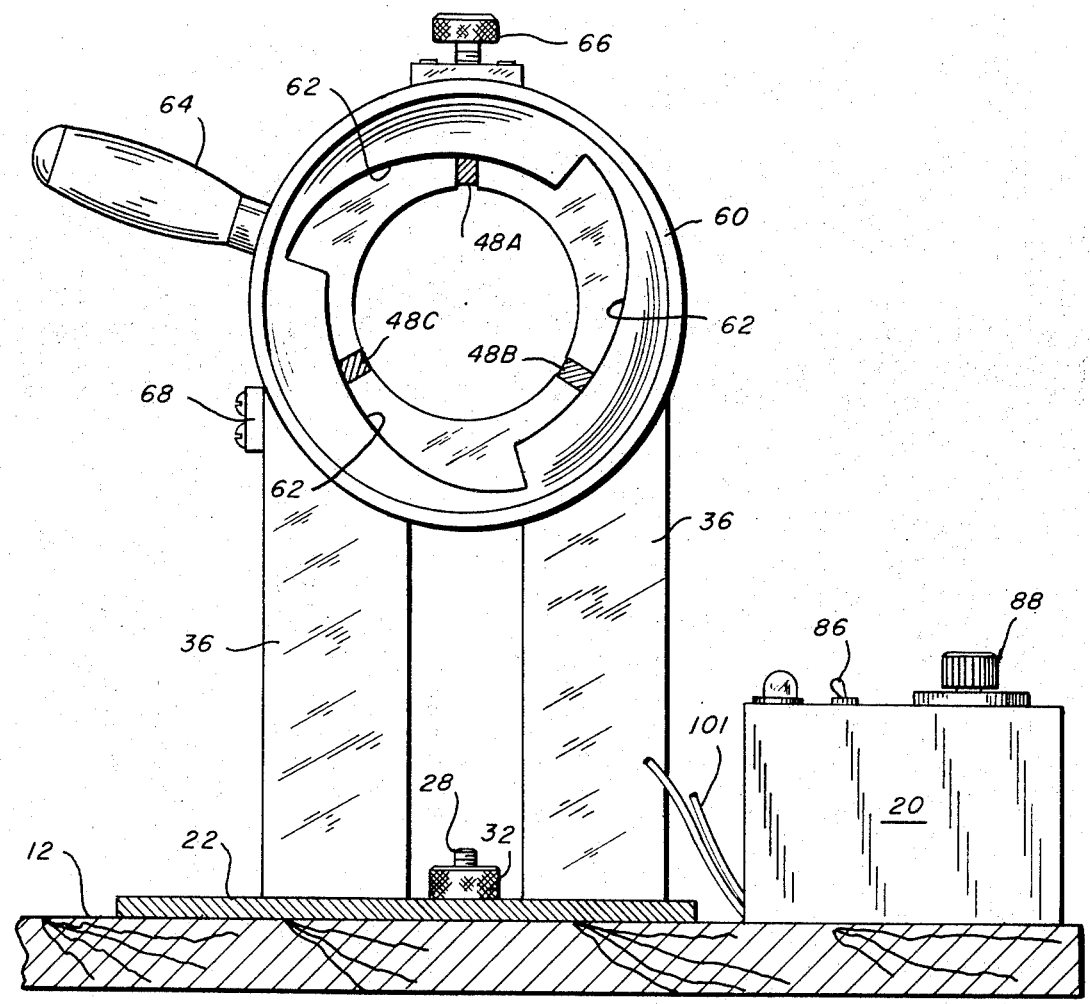
FIG. 4 is a partial cross-sectional view taken along line 4—4 of FIG. 1.

Looking now at FIG. 1, there is shown the top view of the line winder apparatus 10 of this invention which winds monofilament fishing line 5 onto a spinning reel 6 of the type having a pickup cylinder 7, revolvable about a stationary spool 8. Pickup cylinder 6 carries a pickup bail 9 which guides line 5 onto the spool. Manipulation of a crank 4 revolves pickup cylinder 7 and also effects backward-forward oscillatory movement of the spool to assume even distribution of the line thereon. Conversely the rotation of spool 7 relative to a pickup cylinder 7 also effects oscillatory movement of the spool. A leg 3 connects a foot 2 to the reel. Foot 2 provides means for attaching the reel to a fishing pole not shown.

A rectangular support platform 12 rotatably supports at the rearward end thereof on a vertical shaft 15 a bulk spool 14, a reel chuck assembly 16 forward of the bulk spool and a reel rotating mechanism 18 forwardly of the chuck assembly. Electrical switches and associated circuitry for controlling the line winder apparatus are enclosed in an enclosure 20 juxtaposed from he chuck assembly 16.

Looking now at FIG. 2 of the drawings, the reel chuck assembly 16 includes a base 22 having therein elongated slots 24 and 26.

Secured to and vertically projecting upwardly from support platform 12 are threaded studs 28 and 30 which project through slots 24 and 26. Base 22 is longitudinally slidable on the platform 12 relative to the reel rotating mechanism 18. Nut members 32 and 34 threadedly engage studs 28 and 30 and serve as means for locking base 22 in a fixed position relative to the support plate. Carried on the forward end of base 22 upwardly thereof by means of suitable struts 36 are spaced-apart forward and rearward support rings 40 and 42 having a coaxial axis running substantially parallel to the longitudinal axis of base 22.

Support ring 40 includes a smooth radial, lip surface 58 on which rotatably rides the mating surface of a cam element 60. A thumbscrew lock 66 threadedly passing through cam element 60 and having the lower end thereof bearable against lip surface 58 provides a means of securing cam element 60 in a desired position.

Looking now at FIG. 3, as well as FIG. 2 cylindrical ring 42 has cut in the peripheral surface thereof at equidistant points cross slots 44. Cylindrical ring 40 has cut in the peripheral surface thereof rectangular slots 46 in registered alignment with the upright portion of cross slots 44.

Received in slots 44 and 46 are forwardly rearwardly extending arms 48A, 48B and 48C. Each of the arms includes a transverse roll pin 47 riding in the cross portion of slot 44 to provide a pivot point for the arm. The rearward end of each arm extends rearwardly of cylindrical ring 42 and has cut therein a recess 50. The forward end of each arm projects forwardly of cylindrical ring 40 and contains a protrusion 52 which collectively forms a circular outline for gripping pickup cylinder 7 of reel 6. To increase the gripping ability of the protrusion 52, such are inwardly tapered and are covered by a latex sleeve 54.

Encompassing the rearward ends of the arms and nested in recesses 50 is a circular spring 56 which outwardly biases the forward end of the arms.

Looking now at FIG. 4, cam element 60 includes on the inner peripheral edge thereof cam surfaces 62 which abut against each of the arms 48A, 48B and 48C. A handle 64 facilitates a rotative movement of the cam relative to the arms. Such rotative movement depending on the direction of rotation either expands or contracts the circular outline at the forward terminal ends of the arms to enable the arms to grasp different diametered pickup cylinders.

A stop 68 projects outwardly from one of struts 36 and is engageable with handle 64 to prevent slippage of any of the arms 48A, 48B and 48C into a neighboring cam surface.

Returning now to FIG. 1, a yardage counter 104, a device well known in the art, is mounted on base 22 intermediate bulk spool 114 and support ring 42 and is adaptable to line 5 to measure the desired yardage during use of the apparatus 10.

Reel rotating mechanism 18 comprises a sheave 70 mounted on a shaft 72 which is rotatably secured to a frame 74. A belt 76 enveloping the periphery of the sheave and the output shaft of a motor 78 provides a rotating movement of the sheave. Carried by sheave 70 is a rearwardly projecting fork member 80 which engages the leg of the fishing reel to impart rotation of the reel housing and the normally stationary fishing line spool. The fork is received within a radial elongated slot on the sheave such that different size legs can be accommodated. A counterweight 82 compensates for the weight of the fork.

Looking now at the switching assembly such includes an off-on switch 84 and a clockwise-counterclockwise switch 86 which determines the direction of rotation of sheave 70. The velocity of rotation of the sheave is controlled by an electronic speed controller 88. A plug 90 insertable in the 110-volt receptacle furnishes electrical energy to the system while a conduit 77 couples motor 78 with the switching assembly. A light 38 is energized at the completion of the line winding operation.

Figure 5:
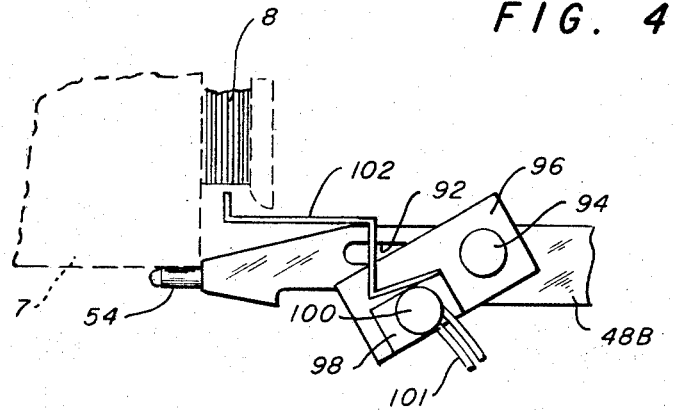
FIG. 5 is an expanded view of the forward end of one of the arms of the invention.

Looking now at FIG. 5, arm 48B has cut therein an elongated longitudinal slot 92. Adjustably attached to arm 48 by means of a bolt 94 working in slot 92 is a switch plate 96. An electrical switching device 98 is adjustably mounted to switch plate 96 by a bolt 100 and is electrically coupled to circuitry in enclosure 20 by conduit 101. Electrical switching device 98 has a pivotal arm actuator 102 which has a terminal head disposed slightly outwardly of the cylindrical portion of line spool 8 such that actuation of switching device 98 is controlled by the thickness of the coil of line wound on the line spool. By the adjustment of the head of actuator arm, the actuation point of the switch can be alterably selected.

FIG. 6 shows a typical wiring schematic for the line winder apparatus 10. As can be appreciated from the schematic, actuation of switching device 98 de-energizes motor 78.

In operation, the pickup cylinder of a fishing reel which is to be fitted with line is grasped and held by the arms 48A, 48B and 48C through the manipulation of handle 64 whereupon the arms are locked in position by thumbscrew lock 66. Base 22 is then slid forwardly to enable fork 80 to engage the leg of the fishing reel. Line is then taken from the bulk spool 14 wrapped around counter 104, threaded through rings 40 and 42 over the bale of the fishing line reel and attached to line spool 8. Arm actuator 102 is then adjusted to a position corresponding to the amount of line desired to be wound on the spool. Motor 78 is then energized to rotate sheave 70 which in turn rotates the housing and line spool 8 of the fishing reel to cause line to convolute onto the spool. As before mentioned, the internal mechanism of the fishing reel causes the line spool to oscillate back and forth relative to the bale to evenly distribute the fishing line onto the spool.

When the predetermined yardage of line has been wound onto the spool, arm 102 actuates switch 98 to de-energize the motor.

As used herein, the term "bulk spool" is considered generic to spools of relatively small line yardage, i.e., 25, 50 or 100 yards, as well as those of greater line yardage.

During the detailed description of the preferred embodiment, specific language has been used for the sake of clarity. However it is to be understood that the language used are not words of limitation but include all equivalents which are presented in a similar manner and accomplish a similar purpose. As can be seen the line winder of this invention presents an apparatus particularly adaptable for retail store operation wherein many fishing reels having different diameter pickup cylinders need to have line wound thereon.

What is claimed:

1. An apparatus for transferring fishing line from a bulk spool onto a spool of a spinning reel of the type using a pickup cylinder revolvable coaxially about said spinning reel spool comprising:
   a support platform;
   a chuck assembly for holding said spinning reel comprising:
      a base member attached to said support platform;
      a plurality of elongated arm members carried by said base member and longitudinally extending therefrom in a forwardly-rearwardly direction substantially parallel to said base member; said arm members having forward terminal ends arranged in a circular outline about a first axis for attachment to said pickup cylinder of said spinning reel;
   a shaft supported by said support platform for rotatably carrying said bulk spool; and
   means for rotating said spinning reel spool whereby line having an end attached to said spinning reel spool is wound thereon from said bulk spool.

2. An apparatus as in claim 1 wherein said arm members are carried by said base member by two spaced-apart forward and rearward support rings supported by struts; said arm members being pivotally secured to said rearward ring and the forward ends thereof projecting forwardly therefrom and through said forward ring;
  biasing means outwardly biasing the forward ends of said arm members;
  a cam element encompassing said arm members and having inner cam surfaces contiguous with said arm members and adapted upon rotative movement thereof to vary the diameter of said circular outline whereby pickup cylinders of different diameter can be attached and carried by said forward terminal ends of said arm member.

3. An apparatus as in claim 1 wherein said means for rotating said spinning reel spool comprises a sheave rotatably driven by an electric motor; said sheave carrying a rearwardly projecting fork member which engages said spinning reel; the position of said fork member on said sheave being adjustable.

4. An apparatus as in claim 3 including means for automatically stopping rotation of said spinning reel spool when a predetermined yardage of line has been wound thereon comprising:
  motor control circuitry for controlling the energization of said motor;
  an electrical switching device interconnected to said circuitry; said switching device having an adjustable arm actuator disposed outwardly of said spinning reel spool and actuated by said line when a predetermined amount of said line has been convoluted onto said spinning reel spool.

5. An apparatus as in claim 2 wherein said base member is slidably disposed on said support platform.

* * * * *